United States Patent [19]

Weller et al.

[11] Patent Number: 4,779,517
[45] Date of Patent: Oct. 25, 1988

[54] FRESH AIR SUPPLY DEVICE FOR VEHICLES

[75] Inventors: Karl-Heinz Weller, Gerlingen; Werner Stähle, Sindelfingen; Rolf Marquart, Stuttgart; Hans Trube, Herrenberg; Heinz Koukal; Klaus Arold, both of Sindelfingen, all of Fed. Rep. of Germany

[73] Assignee: Daimler-Benz Aktiengesellschaft, Stuttgart, Fed. Rep. of Germany

[21] Appl. No.: 72,038

[22] Filed: Jul. 10, 1987

[30] Foreign Application Priority Data

Jul. 12, 1986 [DE] Fed. Rep. of Germany ....... 3623635
Mar. 31, 1987 [DE] Fed. Rep. of Germany ....... 3710752

[51] Int. Cl.⁴ .............................................. B60H 3/06
[52] U.S. Cl. .................................................... 98/2.16
[58] Field of Search ................. 98/2, 2.07, 2.11, 2.16, 98/2.17

[56] References Cited

U.S. PATENT DOCUMENTS

| | | | |
|---|---|---|---|
| 2,011,840 | 8/1935 | Arnold et al. | 98/2.17 |
| 2,796,820 | 6/1957 | Moore et al. | 98/2.07 |
| 4,242,951 | 1/1981 | Bemiss | 98/2.16 X |
| 4,437,393 | 3/1984 | Stulz et al. | 98/2.17 |
| 4,597,323 | 7/1986 | Murdau et al. | 98/2.11 |

FOREIGN PATENT DOCUMENTS 39924 4/1981 Japan ..................................... 98/2.16

Primary Examiner—Harold Joyce
Attorney, Agent, or Firm—Barnes & Thornburg

[57] ABSTRACT

A fresh air supply device is disclosed which is connected upstream of a blower of a heating or air conditioning unit in a motor vehicle. The blower is accommodated by a housing with the fresh air entering into a gap between the windscreen and the adjacent hood. The fresh air is deflected while water and foreign bodies are separated and is supplied to a filter underneath the hood. The filter can be exchanged by pulling it out upwards. Downstream of the filter, the air enters the intake side of the blower. In order to prevent unintentional heating up of the fresh air in the intake tract, while retaining easy exchangeability of the filter, the filter is covered by an intake scoop which can be moved away and is thermally shielded relative to the vehicle hood or bonnet.

11 Claims, 2 Drawing Sheets

FRESH AIR SUPPLY DEVICE FOR VEHICLES

BACKGROUND AND SUMMARY OF THE INVENTION

The invention relates to a fresh air supply device which is connected upstream of a blower of a heating or air conditioning unit in a motor vehicle. The blower is accommodated by a housing, with the fresh air entering into a gap between the windscreen and the adjacent vehicle bonnet or hood and, while being deflected and, associated therewith, while water and foreign bodies are separated, being supplied underneath the bonnet to a filter and then entering on the intake side into the blower. The filter can be exchanged by pulling it out upwards.

A fresh air supply device of this type with a high rate of separation is known from the German Patent Specification No. 3330951. The air intake path is long and runs over a broad stretch beneath the hood, which hood is frequently heated up by waste heat from the engine and/or direct solar irradiation, so that the fresh air heats up undesirably at least in the summer months.

It is an object of the invention, while retaining easy exchangeability of the filter, to prevent unintentional heating up of the fresh air in the intake tract due to heat transfers from the vehicle engine space hood to the fresh air.

This object is achieved according to the invention by providing thermal insulation in the space between the top of an air scoop for the fresh air and the bottom of the vehicle hood.

Good thermal insulation is achieved if the intake scoop is made of thermally insulating material according to certain preferred embodiments of the invention.

According to other preferred embodiments of the invention the upper side of the intake scoop is thermally insulated relative to the hood.

So that the filter can easily be reached, the intake scoop is pivotably mounted in certain preferred embodiments.

An additional saving in space and weight is made if the intake scoop is formed at least in part by wall areas of the hood according to certain preferred embodiments.

Moreover, when the hood is swung away, ingress of foreign bodies and water is impossible if, when the hood is swung away, a support part accommodating the filter is covered by a pivoted lid articulated on the supporting part according to certain preferred embodiments.

Other objects, advantages and novel features of the present invention will become apparent from the following detailed description of the invention when considered in conjunction with the accompanying drawings.

DETAILED DESCRIPTION OF THE DRAWINGS

Figure 1:
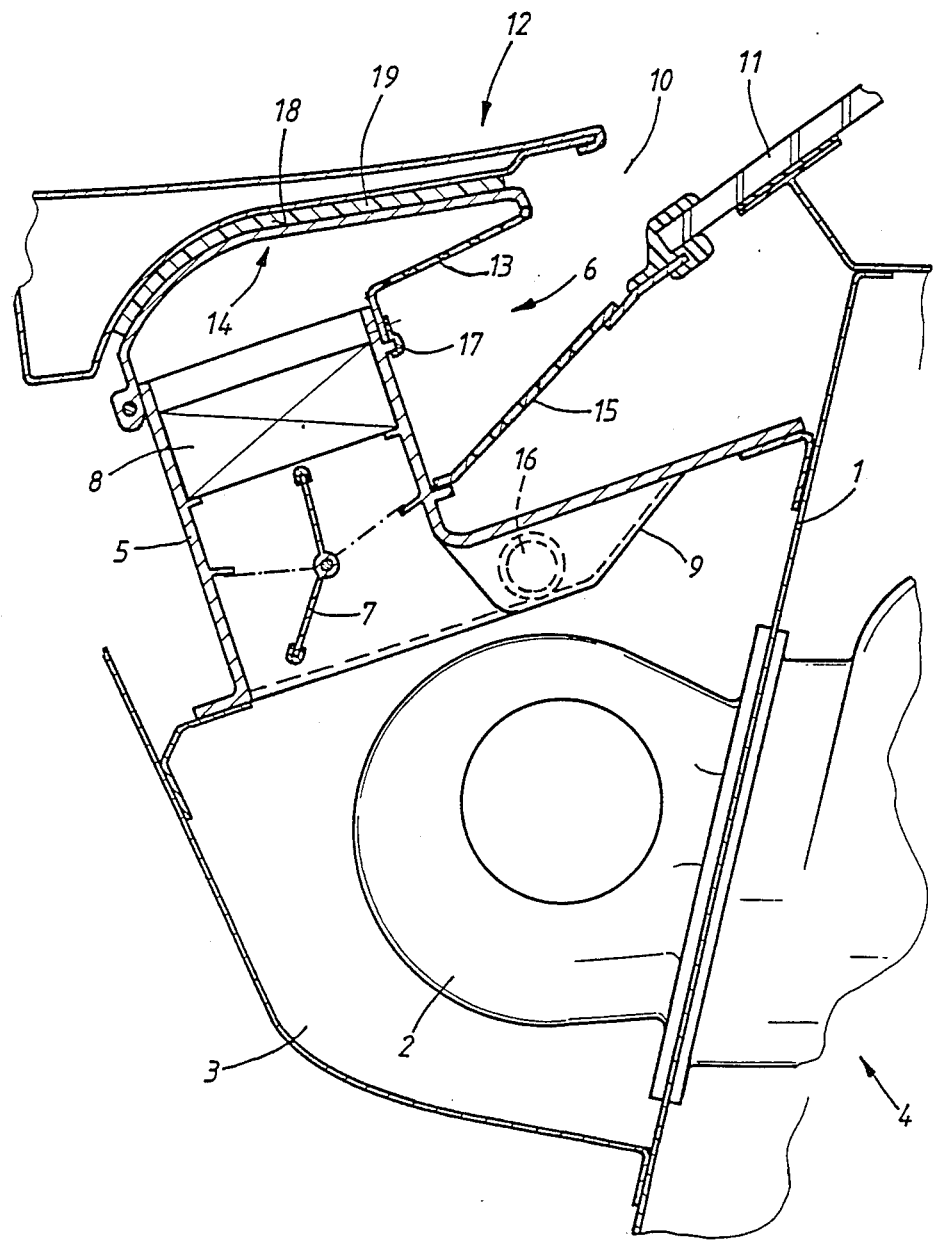
FIG. 1 is a schematic part sectional side view which shows a first embodiment of the invention with an intake scoop secured in position on the supporting part.

In addition to a blower 2, a housing 3 surrounding this blower 2 is secured in position on an end wall 1 of a motor car (not shown in greater detail), whereas other components of a heating or air conditioning unit 4, which is merely schematically indicated, are accommodated, on the passenger compartment side. Reference is also made to the commonly assigned application Ser. No. 72,040 filed on the same date as this application and based on German patent application P No. 36 23 635.7, filed in Germany on July 12, 1986, which application illustrates and describes a mounting arrangement for a blower of the type which could be utilized in practicing the present invention.

A supporting part 5, which forms a component of a fresh air supply device 6, is flange-mounted on the upper side of the housing 3. Apart from accommodating a butterfly valve 7 designed as a main air butterfly valve, the supporting part 5 also accommodates a filter 8, which can be removed upwards, and is also provided with a water separator 9.

The fresh air enters through a gap 10 between the windscreen 11 and a vehicle bonnet or hood 12 in the direction of the supporting part 5, is deflected and flows through a grid 13 which represents a component of a pivotable intake scoop 14 covering the supporting part 5. During this deflection operation, the moisture entrained and also, for example, foreign bodies which have been carried along in the air are separated. Larger foreign bodies such as, for example, leaves are at the same time retained by a grid 15 arranged above the water separator 9, whereas the separated moisture passes through the grid 15 and reaches the water separator 9, the trough of which is roughly of roof-shaped configuration and is made with one discharge 16 each at the lowest points. The air prefiltered in the manner described above—redirected by the intake scoop 14—reaches the filter 8, is subjected there to fine filtration. The air then passes the butterfly valve 7, which is more or less opened wide, and subsequently enters on the intake side into the blower 2.

In so far as described above both exemplary embodiments of FIGS. 1 and 2 are the same. According to FIG. 1, the intake scoop 14 is pivotably fixed on the supporting part 5, and the grid 13, which can be locked via a lock 17 (not shown in greater detail) is connected to the intake scoop 14 in an articulated manner so that, once the bonnet 12 has been swung away and a lock 17 has been released, the intake scoop 14 can be pivoted for exchanging the filter 8. So that the air in the area of the intake scoop 14, during ventilating operation, does not heat up by the transfer of heat from the adjacent hood 12 during the warm time of the year, a thermally insulating layer 19 is arranged between the hood 12 and the upper side 18 of the intake scoop 14. In addition to or instead of this layer 19, the intake scoop 14 can be made of thermally insulating material according to other embodiments.

Figure 2:
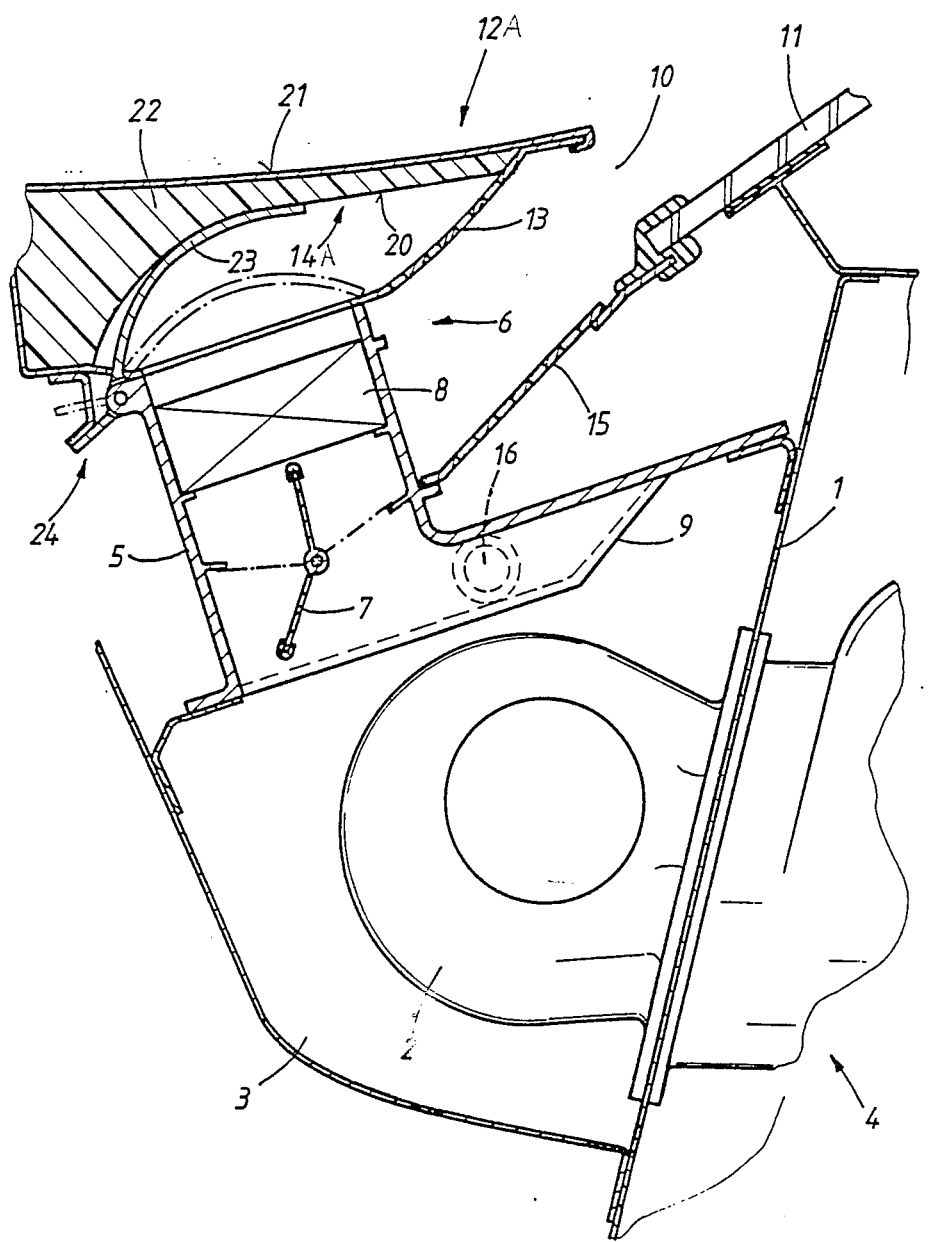
FIG. 2 is a similar view which shows another exemplary embodiment in which the intake scoop is formed by areas of the hood.

In the exemplary embodiment according to FIG. 2, the intake scoop 14A is formed by wall areas 20 of the hood 12A and portions of pivoted lid 23. The grid 13 also represents a fixed component of the hood 12A which is provided with a shaped insulating body 22 beneath its skin 21. Thus when the hood 12A is pivoted, the intake scoop 14A is also pivoted along with it at the same time. So that no dirt can reach the filter 8 when the hood 12A is open, the filter 8 is covered by a pivoted lid 23 which is secured in position on the supporting part 5 and, when the hood 12 is closed, is moved over into its open position by a control device 24, whereas, when the hood 12 is open, it moves into its closed position, shown in chain-dotted lines, by its own weight or by spring assistance.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Fresh air supply device for supplying fresh air to a housing of a blower for a vehicle heating or air conditioning unit, with the fresh air entering via a gap between a vehicle windscreen and a movable engine hood covering a vehicle engine space, comprising:

an air filter disposed upstream of the blower housing, and an air intake scoop covering the filter from above an including means for guiding fresh air from the gap between the windscreen and thehood to the filter, at least portions of said intake scoop being mounted for movement between a closed position covering the filter to an open position accommodating removal of the filter, said portions of the intake scoop being covered from above by the engine hood when the engine hood is in a closed vehicle operating position, and thermal insulation means disposed between the hood and the intake scoop.

2. Fresh air supply device according to claim 1, wherein the intake scoop is made of thermally insulating material.

3. Fresh air supply device according to claim 1, wherein the upper side of the intake scoop is thermally insulated relative to the hood.

4. Fresh air supply device according to claim 1, wherein the intake scoop is pivotally mounted.

5. Fresh air supply device according to claim 1, wherein the intake scoop is formed, at least in part, by wall areas of the hood.

6. Fresh air supply device according to claim 5, wherein when the hood is swung away, a supporting part accommodating the filter is covered by a pivoted lid articulated on the supporting part.

7. Fresh air supply device according to claim 2, wherein the intake scoop is pivotally mounted.

8. Fresh air supply device according to claim 3, wherein the intake scoop is pivotally mounted.

9. Fresh air supply device according to claim 1, wherein upwardly facing portions of the intake scoop clampingly engage with downwardly facing portions of the hood when the hood is in a closed in use position on the vehicle to thereby maintain the intake scoop in position.

10. Fresh air supply device according to claim 9, wherein the upwardly facing portions of the intake scoop are covered with thermal insulation layer means.

11. Fresh air supply device according to claim 9, wherein the downwardly facing portion of the hood borders on an insulation layer carried by the hood.

* * * * *